United States Patent [19]

Zinnes et al.

[11] 3,868,367

[45] Feb. 25, 1975

[54] 4-HYDROXY-3-(5-ISOXAZOLYLCARBAMOYL)-2H-1,2-BENZOTHIAZINE 1,1-DIOXIDES

[75] Inventors: Harold Zinnes, Rockaway; Martin L. Schwartz, Gillette; Neil A. Lindo, Chatham; John Shavel, Jr., Mendham, all of N.J.

[73] Assignee: Warner-Lambert Company, Morris Plains, N.J.

[22] Filed: Apr. 11, 1974

[21] Appl. No.: 460,266

[52] U.S. Cl. .............................. 260/243 R, 424/246
[51] Int. Cl. ............................................ C07d 93/02
[58] Field of Search ................................ 260/243 R

[56] References Cited
UNITED STATES PATENTS 3,822,258  7/1974  Zinnes et al. .................. 260/243

Primary Examiner—John M. Ford
Attorney, Agent, or Firm—Albert H. Graddis; Frank S. Chow

[57] ABSTRACT

Compounds of the formula:

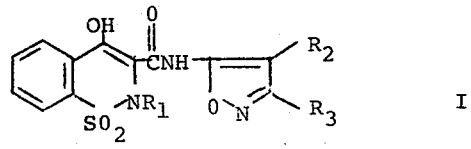

wherein $R_1$, $R_2$ and $R_3$ are hydrogen or alkyl. These compounds are useful as antiinflammatory agents.

3 Claims, No Drawings

4-HYDROXY-3-(5-ISOXAZOLYLCARBAMOYL)-2H-1,2-BENZOTHIAZINE 1,1-DIOXIDES

The present invention relates to compounds of the formula:

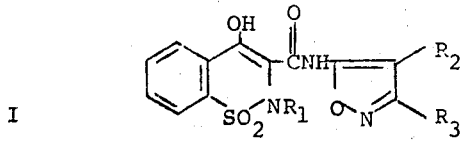

I wherein $R_1$, $R_2$ and $R_3$ are hydrogen or alkyl.

"Alkyl" as used herein is meant to be the residue derived from an aliphatic hydrocarbon having 1 to 7 carbon atoms. These include, for example: methyl, ethyl, propyl, isopropyl, butyl, isobutyl and the like.

These compounds also form salts with alkali metals and alkaline earth metals; these salts are included within the scope of this invention.

Compounds I and their salts are useful as antiinflammatory agents. For example, when administered orally to rats at about 100 mg/kg they are able to cause reduction in swelling of the paw induced by injection into the foot pads of an irritant such as carrageenin.

These compounds are indicated in the management of conditions such as rheumatoid arthritis. Generally an oral dose of 100 mg/kg 2 or 3 times daily is suggested. This dose can be varied depending upon the conditions of the patient, for example, age, sex and weight of the patient by methods known to the healing arts.

For oral administration the compounds of these salts are formulated with diluents such as lactose and then encapsulated in gelatin capsules.

According to the present invention, these compounds are prepared by refluxing an ester of structure II, where $R_4$ is alkyl, with an appropriate 5aminoisoxazole derivative of structure III in a solvent such as xylene.

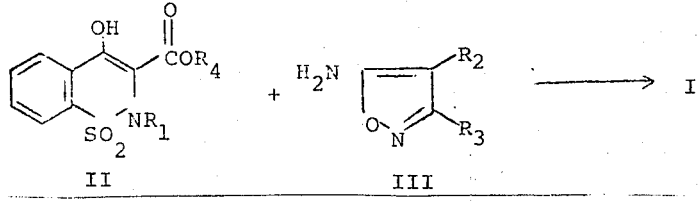

The starting material II is prepared as described in U.S. Pat. No. 3,501,466. The starting 5-amino-isoxazoles (III) are prepared as described in Chem. Pharm. Bull. Japan 14 1277 (1966) and Brit. Patent 595,775 (1947); C. A. 42 4202 (1948) (Hofmann La Roche).

As indicated above, compound I forms salts with alkali metals, alkaline earth metals and amines. For example, sodium, potassium, calcium, and triethanolamine. These are prepared by treating, for example, the parent moiety with sodium, potassium, or a calcium hydroxide. The salts are recovered by conventional techniques.

In order to further illustrate the practice of this invention, the following examples are included:

EXAMPLE 1

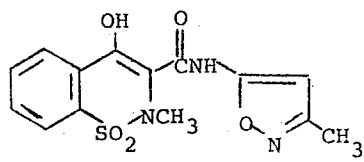

4-Hydroxy-2-methyl-N-(3-methyl-5-isoxazolyl)-2H-1,2-benzothiazine-3-carboxamide 1,1-Dioxide. — A mixture of 19.8 g (0.07 mol) of 3-carbethoxy-4-hydroxy-2-methyl-2H-1,2-benzothiazine 1,1-dioxide, 7.0 g (0.077 mol) of 5-amino-3-methylisoxazole, and 300 ml of xylene was refluxed for 22 hrs. in a Soxholet apparatus, the thimble of which contained 10 g of Linde 4A molecular sieve. The reaction mixture was allowed to stand at room temperature and the resulting precipitate was collected to give 16.9 g of material, mp 236° to 246°C dec. Recrystallization from 1,4-dioxan gave 11.0 g of product, mp 249 to 254°C dec.

Anal. Calcd for $C_{14}H_{13}N_3O_5S$: C, 50.14; H, 3.91; N, 12.53; S, 9.56. Found: C, 50.12; H, 4.07; N, 12.42; S, 9.61.

EXAMPLE 2

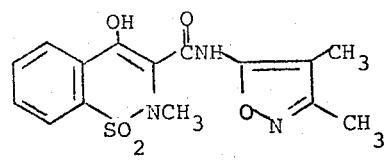

N-(3,4-Dimethyl-5-isoxazolyl)-4-hydroxy-2-methyl-2H-1,2-benzothiazine-3-carboxamide 1,1-Dioxide. — The same procedure was employed with 5.7 g (0.02 mol) of 3-carbethoxy-4-hydroxy-2-methyl-2H-1,2-benzothiazine 1,1-dioxide, 3.4 g (0.03 mol) of 5-amino-3,4-dimethyl-isoxazole, and 150 ml of xylene. Allowing the reaction mixture to cool to room temperature caused precipitation of 5.75 g of material, mp 180°–187° dec. Recrystallization from methanol gave 4.4 g of product, mp 190°–192° dec.

Anal. Calcd for $C_{15}H_{15}N_3O_5S$: C, 51.57; H, 4.33; N, 12.03; S, 9.18. Found: C, 51.75; H, 4.29; N, 11.85; S, 9.34.

We claim:
1. A compound of the formula:

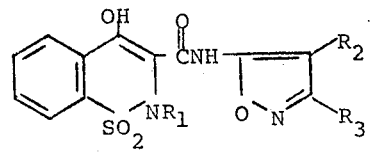

wherein $R_1$, $R_2$ and $R_3$ are hydrogen or alkyl of 1 to 7 carbon atoms and nontoxic pharmaceutically acceptable salts thereof.

2. A compound according to claim 1 which is 4-hydroxy-2-methyl-N-(3-methyl-5-isoxazolyl)-2H-1,2-benzothiazine-3-carboxamide 1,1-Dioxide.

3. A compound according to claim 1 which is N-(3,4-dimethyl-5-isoxazolyl)-4-hydroxy-2-methyl-2H-1,2-benzothiazine-3-carboxamide 1,1-Dioxide.

* * * * *